April 20, 1954  R. M. COLEMAN ET AL  2,675,642
TOY ROCKET
Filed April 4, 1952  2 Sheets-Sheet 2
Fig.3.
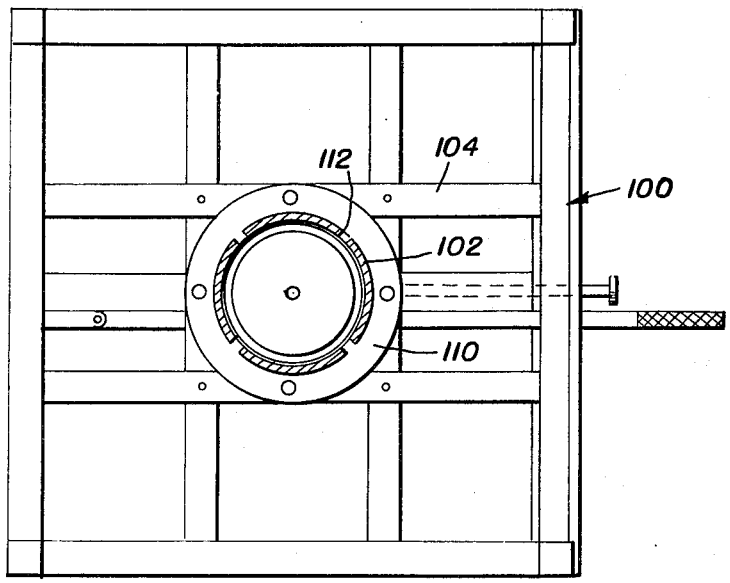
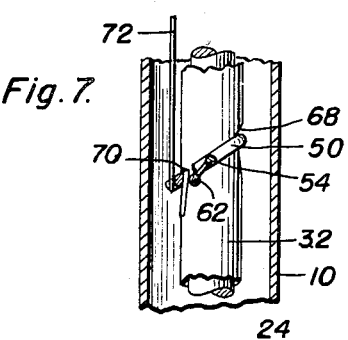
Fig.7.
Fig.6.
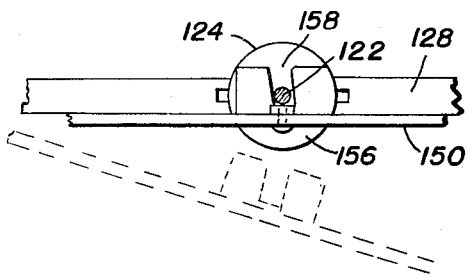
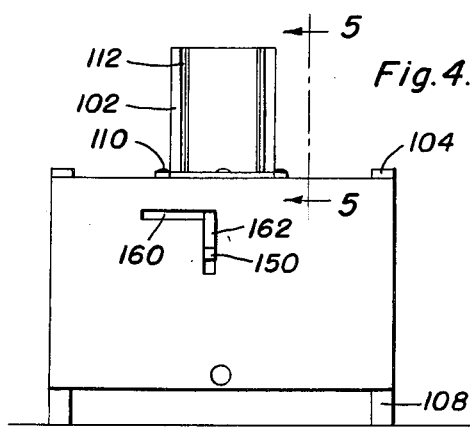
Fig.4.
Fig.5.
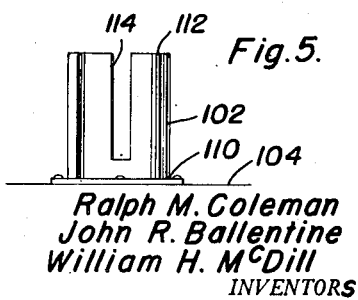
Ralph M. Coleman
John R. Ballentine
William H. McDill
INVENTORS
BY Clarence A. O'Brien
and Harvey B. Jackson
Attorneys

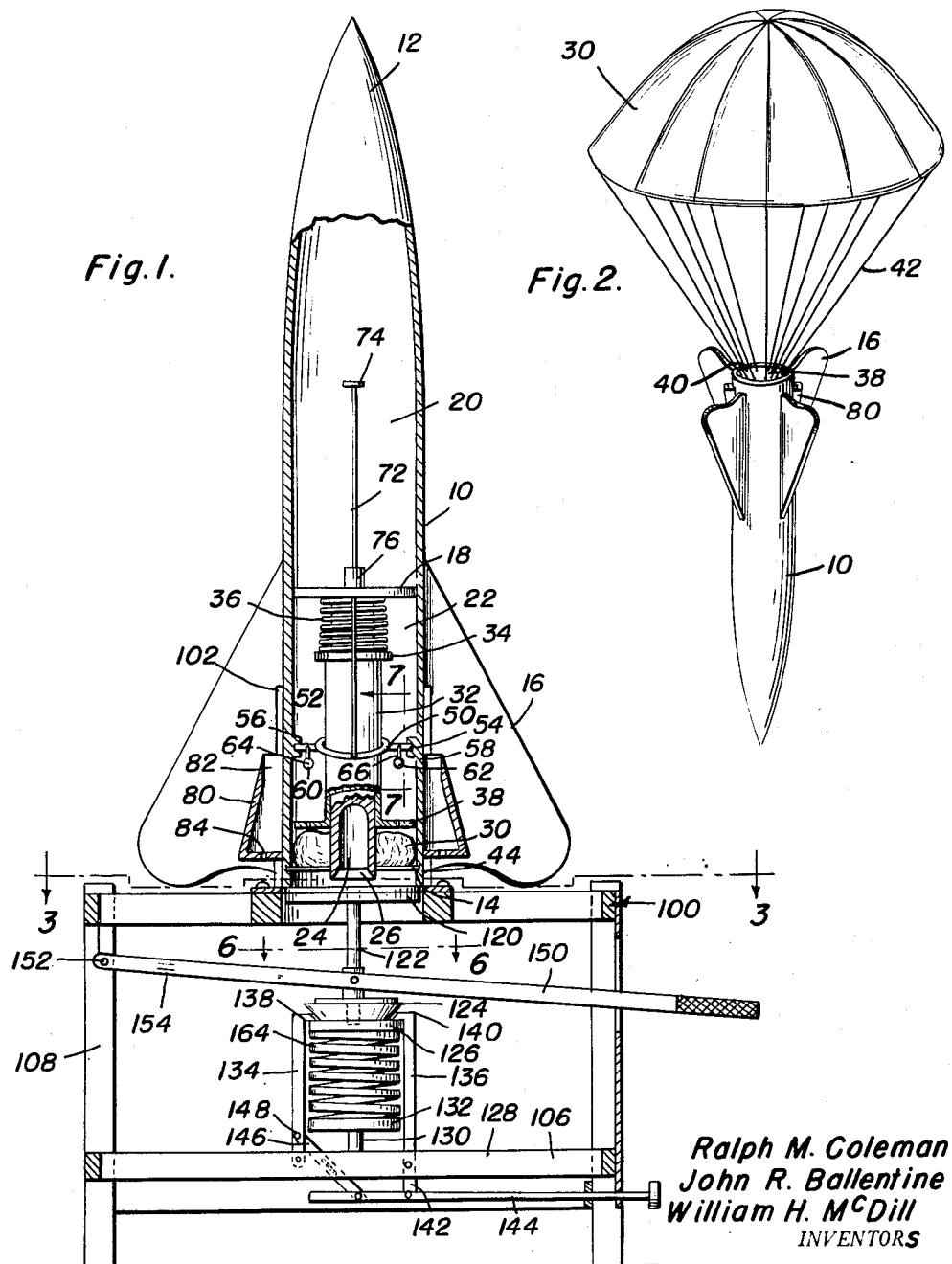

UNITED STATES PATENT OFFICE 2,675,642

TOY ROCKET

Ralph M. Coleman, John R. Ballentine, and William H. McDill, El Paso, Tex.

Application April 4, 1952, Serial No. 280,622

4 Claims. (Cl. 46—86)

This invention relates to a rocket and particularly to a toy simulating a rocket and having a catapult projecting the rocket into flight together with simulated propulsion and bursting charges.

The present invention relates to that class of toys simulating war-type rockets in which the rocket is propelled or started in motion by means of a catapult and if desired may be continued in flight by means of a propeller charge and which carries a parachute which may be released by the change in direction of flight so that the rocket may be recovered and reused repeatedly. The rocket is also provided with simulated war heads which carry a charge of dust producing powder which simulates the exploding of the rocket at the instant of reversal of direction of flight.

The invention is carried out by means of a rocket-like body having a propulsion chamber and a parachute releasing device mounted therein together with directing fins and a war-head or heads mounted exteriorly of the body and adjacent the base thereof. The launching rocket is provided with a guide track or tube over which the rocket is propelled by means of a compression spring device which may be cocked by means of a cocking lever and controlled by means of a seat and trigger mounted in the frame.

It is accordingly an object of the invention to provide a toy rocket.

It is a further object of this invention to provide a toy rocket having a parachute for lowering the same after firing.

It is a further object of this invention to provide a rocket having a parachute release operated by a mass responsive to direction of motion of the rocket.

It is a further object of the invention to provide a rocket having a parachute release depending upon the orientation of the rocket in flight.

It is a further object of this invention to provide a rocket having a war-head mounted adjacent the base thereof.

Other objects and many of the attendant advantages of this invention will be readily apparent from the following detailed description taken in conjunction with the accompanying drawing, in which:

Figure 1 is a sectional elevation through a rocket in firing position;

Figure 2 is an elevational view of the rocket in descending position;

Figure 3 is a cross section of the launching catapult taken substantially upon the plane indicated by the line 3—3 of Figure 1;

Figure 4 is a front elevation of the launching catapult;

Figure 5 is an elevation of the launching guide;

Figure 6 is an enlarged plan view of the cocking mechanism taken substantially upon the plane indicated by the line 6—6 of Figure 1; and Figure 7 is a detailed view of the parachute release taken substantially on the plane indicated by the line 7—7 of Figure 1.

In the exemplary embodiment of the invention a substantially tubular body 10 is provided with an ogive nose 12 and has an open after portion 14. A plurality of stabilizing fins 16 are attached to the rear portion of the body 10 and preferably are of outwardly diverging form and of radial position.

The body 10 is provided intermediate the ends thereof with a transverse partition 18 dividing the body 10 into a forward chamber 20 and rear chamber 22. A tubular combustion chamber 24 is rigidly attached to the partition 18 and extends axially toward the rear of the body and has an exhaust or driving nozzle 26 substantially on the plane of the rear 14 of the body 10.

When the rocket is to be substantially propelled only by the catapult, the chamber 24 may be provided with a slow burning fuel such as gun powder or cordite to produce a lot of fumes, smoke and noise to simulate the drive of a rocket but, when a propulsion charge is to be used for actually lifting the rocket a more intense and faster burning fuel will be utilized. Obviously, the chamber 20 may be used to store a fluid fuel under pressure or, the chamber 20 may be used to receive and protect a plurality of expansible rubber-like bags which may contain any liquid or other fluid fuel.

A parachute 30 is used to lower the rocket after it has been fired and is preferably stored or packed adjacent the rear opening 14 of the rocket. The release and control mechanism for the parachute 30 comprises a cylindrical sleeve 32 mounted on the tubular chamber 24 and slidable therealong. Preferably a pressure plate 34 is secured on the front end of the sleeve 32 and a spring 36 is received between the plate 34 and the partition 18. Obviously, the spring 36 will tend to resiliently, yieldably urge the sleeve 32 rearwardly along the combustion chamber 34. A plate 38 is attached to the rearward end of the sleeve 32 and it preferably substantially fills the space between the combustion chamber 24 and the body 10. The plate 38 is provided with a plurality of apertures 40 in which are secured the shroud lines 42 of the parachute 30. The parachute 30 and the shroud lines 42 are packed on the plate 38 and are retained in the rear portion of the body 10 by means of a resilient washer 44. Preferably the washer 44 is readily pliable and is of only sufficient size to readily retain the parachute 30 on the plate 38.

An inertia lock for the tube 32 comprises a ring 50 which freely embraces and is slidable on the tube 32. The ring 50 is provided with stub axles 52 and 54 which extend radially from diametrically opposite sides of the ring 50. The outer ends of the stub axles 52 and 54 are mounted in bearing bosses 56 and 58 on the inner surface of the body 10. Weights 60 and 62 are mounted at the ends of arms 64 and 66 which are rigidly connected to the arms 52 and 54 respectively and extend substantially in the plane of the ring 50. The sleeve 32 is preferably provided with oppositely disposed grooves 68 and 70 so that when the rocket is in upright position with the nose 12 upward the weights 60 and 62 will bias the ring 50 into engaging relation with the notches 68 and 70. A trip rod 72 provided with a stop head 74 is connected to the ring 50 at a point transverse to the axles 52 and 54 and preferably extends longitudinally within the rocket and has mounted thereon a sliding weight 76. The weight 76 being operative when the rocket reverses its position so the nose 12 is downward to slide along the rod 72 and strike the head 74 to remove the ring 50 from the notches 68 and 70 and release the sleeve 32 for longitudinal motion on the chamber 24.

War-heads 80 are mounted in adjacent the base of the body 10 and preferably comprise outwardly diverging chambers having a forward opening 82 and a rear aperture 84. The war-heads 80 are preferably filled with some sort of smoke producing powder such as talcum or other light powder which, when the rocket reverses its direction of flight, same will be poured from the opening 82 to simulate an explosion in mid-air.

The rocket is launched from a catapult comprising a frame 100 having a guide tube or track 102 mounted thereon. Preferably the frame 100 is provided with an upper platform 104 and a lower platform 106 and a plurality of legs 108 maintaining the platforms 104 and 106 in suitable spaced relation to each other and also mounting the entire catapult thereon. The track 102 is preferably provided with a substantially annular base 110 which is connected to the platform 104. The track 102 is also provided with longitudinally extending slots 112 adapted to permit the fins 16 to set therein and may also be provided with slots 114 for receiving war-heads 80.

The propulsion part of the catapult comprises a plunger having a cross head 120 adapted to reciprocate in the track 102 and has rigidly secured thereto an axial pitman 122 to the end of which is secured a head 124 and a sear plate 126. The cross member 128 is mounted in the frame 100 and has a guide rod 130 and a spring base 132 rigidly mounted thereon.

Sear members 134 and 136 are pivotally mounted on the cross bar 128 and have hook-like ends 138 and 140 engaging the sear plate 126. The sear 136 has an extending end 142 which is pivotally connected to a trigger 144 and the sear 134 is connected to the trigger 144 by means of an actuating member 146 which is pivotally connected to sear 134 at a point 148 above the cross bar 128. So that actuation of the trigger 144 cause the sears 144 and 136 to oscillate about their pivot points in opposite direction.

A cocking lever 150 is pivotally connected to one of the legs 108 by means of a pivot pin 152 and is also provided with a pivot intermediate its length as at 154, the pivots 152 and 154 being transverse to each other. A U-shaped member 156 is secured on the lever 154 and is provided with a notch 158 for engaging the pitman 122.

In the operation of the rocket according to the invention the parachute and its shroud lines is packed on the plate 38 and the sleeve 32 moved against the tension of the spring 36 so that the ring 50 may be shifted into locking position. The war-heads 80 may be filled with any suitable explosion simulating material and if desired the combustion chamber 24 may be provided with any suitable fuel preferably in the form of a capsule which readily fits within the chamber 24. Any suitable means, not shown, may be utilized for igniting the fuel in the chamber 24. The catapult will be cocked by moving the cocking lever 154 laterally in the slot 160 so that the slot 158 will embrace the pitman 122 and the U-shaped member 156 will rest on the head 124. The lever 150 will then be depressed in the slot 162 to compress the spring 164 and the trigger rod 144 will be operated to cause the hook-like ends of the sears 134 and 136 to engage on the sear plate 126 and lock the spring in compressed position. The lever 150 will then be moved upward in the slot 162 and outwardly in the slot 160 to release the member from the pitman 122. The rocket will then be placed in the track 102 with the fins 16 in the slots 112 and the war-heads 80 in the slots 114. The trigger 144 will then be actuated to release the sears 134 and 136 and the sear plate 126 so that the plunger will be reciprocated along the track to propel the rocket upwardly from the launching platform. If a propeller other than the spring is also used suitable means will be provided for igniting the charge at the instant of the release of the spring. When the rocket has reached the end of its flight, it will turn over so that the point 12 is downward at which time the weight 76 will slide along the rod 72 and strike the head 74 to violently release the ring 50 from the notches 68 and 70 so that the sleeve 32 will be moved along the combustion chamber 24 by means of the spring 36 so that the parachute 30 will be expelled from the rear 14 of the body 10 so that the parachute may expand and gradually lower the projectile to the ground. The opening of the parachute will provide sufficient impetus to the powder in the war-heads 80 so they will be spilled out of the openings 82 and simulate an explosition of the rocket in air.

It will thus be seen that the present invention provides a toy rocket having all the methods of simulating the action of a war rocket.

While a particular embodiment of the invention has been shown, and described according to the best present understanding thereof, it will be apparent to those skilled in this art that many changes and modifications can be made therein without departing from the true spirit of the invention.

Having described the invention, what is claimed as new is:

1. A rocket-like device comprising a cylindrical body, an ogive nose on said body, stabilizing fins mounted adjacent the rear of said body, a partition mounted intermediate the ends of said body, a tubular combustion chamber anchored on said partition and extending axially of said body, a sleeve slidably mounted on said combustion chamber, a resilient means biasing said sleeve for longitudinal motion along said combustion chamber, an inertia latch releasably retaining said sleeve in predetermined position on said chamber, an annular plate adjacent the after end of said sleeve, a parachute packed on said plate, shroud lines securing said parachute to said plate, a flexible retaining washer adjacent the after end of said body, said washer yieldingly maintaining said parachute in said body, an actuating rod connected to said latch, a control weight slidably mounted on said rod.

2. A rocket comprising an elongated tubular body, an ogive nose on said body, a transverse partition intermediate the ends thereof a rearwardly extending tubular chamber mounted on said partition, a sleeve slidably mounted on said chamber, a spring interposed between said partition and said sleeve, a locking ring slidably engaging said sleeve, stub axles secured at opposed points on said ring, said axles being journalled in said body, weights biasing said ring for rotative movement about the axis of said stub axles.

3. A rocket comprising an elongated tubular body, an ogive nose on said body, a transverse partition intermediate the ends thereof a rearwardly extending tubular chamber mounted on said partition, a sleeve slidably mounted on said chamber, a spring interposed between said partition and said sleeve, a locking ring slidably engaging said sleeve, stub axles secured at opposed points on said ring, said axles being journalled in said body, weights biasing said ring for rotative movement about the axis of said stub axles, a trip rod secured to said ring, said trip rod extending longitudinally of said body, an actuating weight slidable on said trip rod.

4. A rocket comprising an elongated tubular body, an ogive nose on said body, a transverse partition intermediate the ends thereof, a rearwardly extending tubular chamber mounted on said partition, a sleeve slidably mounted on said chamber, a spring interposed between said partition and said sleeve, a locking ring slidably engaging said sleeve, stub axles secured at opposed points on said ring, said axles being journalled in said body, weights biasing said ring for rotative movement about the axis of said stub axles, a trip rod secured to said ring, said trip rod extending longitudinally of said body, an actuating weight slidable on said trip rod, an annular plate on said sleeve, a parachute secured to said plate, said parachute being packed in the body adjacent the base thereof, said parachute being expelled from said body when said locking ring is tripped.

References Cited in the file of this patent

UNITED STATES PATENTS

| Number | Name | Date |
|---|---|---|
| 279,539 | Chamberlain | June 19, 1883 |
| 1,079,200 | Wilde | Nov. 18, 1913 |
| 1,357,927 | Clarke | Nov. 2, 1920 |
| 1,394,551 | Hitt | Oct. 25, 1921 |
| 1,639,602 | Gay | Aug. 16, 1927 |
| 2,017,778 | Vido | Oct. 15, 1935 |
| 2,108,818 | Huff | Feb. 22, 1938 |
| 2,398,391 | Orkin | Apr. 16, 1946 |
| 2,478,224 | Armstrong | Aug. 9, 1949 |
| 2,484,320 | Stevens | Oct. 11, 1949 |
| 2,559,458 | Orr | July 3, 1951 |
| 2,563,969 | Skinner | Aug. 14, 1951 |
| 2,568,475 | Vaughan | Sept. 18, 1951 |
| 2,588,184 | Walsh | Mar. 4, 1952 |
| 2,630,654 | Poen | Mar. 10, 1953 |